United States Patent
Wildman

(10) Patent No.: US 9,038,964 B2
(45) Date of Patent: May 26, 2015

(54) CONTROL SURFACE ASSEMBLY

(75) Inventor: Eric Wildman, Bristol (GB)

(73) Assignee: Airbus Operations Limited, Bristol (GB)

( * ) Notice: Subject to any disclaimer, the term of this patent is extended or adjusted under 35 U.S.C. 154(b) by 68 days.

(21) Appl. No.: 13/513,219

(22) PCT Filed: Dec. 6, 2010

(86) PCT No.: PCT/GB2010/052032
§ 371 (c)(1),
(2), (4) Date: Jun. 1, 2012

(87) PCT Pub. No.: WO2011/070347
PCT Pub. Date: Jun. 16, 2011

(65) Prior Publication Data
US 2012/0234983 A1 Sep. 20, 2012

(30) Foreign Application Priority Data
Dec. 8, 2009 (GB) .................................. 0921486.7

(51) Int. Cl.
*B64C 3/50* (2006.01)
*B64C 13/28* (2006.01)
*B64C 9/20* (2006.01)
(Continued)

(52) U.S. Cl.
CPC ........... *B64C 13/28* (2013.01); *Y10T 29/49815* (2015.01); *B64C 9/20* (2013.01); *B64C 9/323* (2013.01); *B64C 2009/143* (2013.01)

(58) Field of Classification Search
CPC ....................................................... B64C 13/28
USPC ......... 244/215, 211, 212, 213, 99.3, 216, 217
See application file for complete search history.

(56) References Cited

U.S. PATENT DOCUMENTS 4,181,275 A * 1/1980 Moelter et al. ................. 244/213
4,381,093 A * 4/1983 Rudolph ....................... 244/216
4,784,355 A 11/1988 Brine
(Continued)

FOREIGN PATENT DOCUMENTS

CA 1 078 804 6/1980
EP 1 516 813 3/2005
(Continued)

OTHER PUBLICATIONS

International Search Report for PCT/GB2010/052032, mailed Mar. 28, 2011.
(Continued)

*Primary Examiner* — Timothy D Collins
*Assistant Examiner* — Jessica Wong
(74) *Attorney, Agent, or Firm* — Nixon & Vanderhye P.C.

(57) ABSTRACT

An aerodynamic control surface assembly comprising: an aerodynamic control surface (4); an actuator (10) for controlling deployment of the control surface; and a locking mechanism (30) moveable from a locked to an unlocked position. When the locking mechanism is set to the locked position, the actuator is operatively coupled to the control surface and the control surface can move in dependently of the actuator when the locking mechanism is set to the unlocked position. Such an assembly may be used in an aircraft to prevent clashing between a deployed flap (16) and a drooped spoiler (4) in the event of an actuator control systems failure.

18 Claims, 6 Drawing Sheets

(51) Int. Cl.
  *B64C 9/32* (2006.01)
  *B64C 9/14* (2006.01)

(56) References Cited

U.S. PATENT DOCUMENTS

| | | | |
|---|---|---|---|
| 4,796,840 A * | 1/1989 | Heynatz | 244/215 |
| 6,079,672 A * | 6/2000 | Lam et al. | 244/217 |
| 6,554,229 B1 * | 4/2003 | Lam et al. | 244/217 |
| 2005/0061922 A1 | 3/2005 | Milliere | |
| 2009/0108129 A1 | 4/2009 | Flatt | |

FOREIGN PATENT DOCUMENTS

| | | |
|---|---|---|
| EP | 1 785 346 | 5/2007 |
| EP | 1 843 943 | 5/2010 |
| GB | 1 487 684 | 10/1977 |
| GB | 1 568 250 | 5/1980 |
| WO | WO 2009/039831 | 4/2009 |

OTHER PUBLICATIONS

Written Opinion for PCT/GB2010/052032, mailed Mar. 28, 2011.
Search Report for GB 0921486.7 dated Mar. 26, 2010.

* cited by examiner

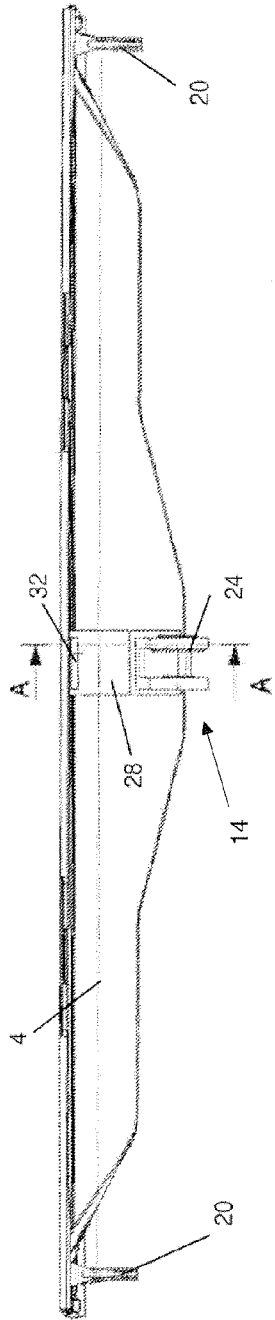
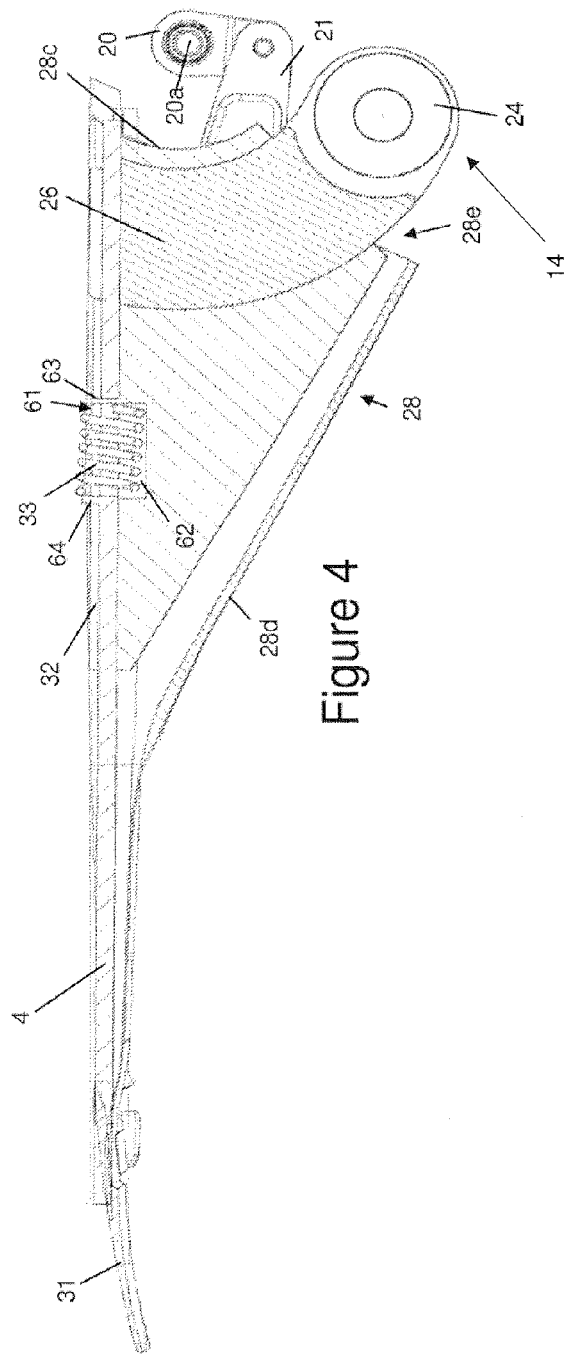
Figure 3
Figure 4

CONTROL SURFACE ASSEMBLY

This application is the U.S. national phase of International Application No. PCT/GB2010/052032 filed 6 Dec. 2010 which designated the U.S. and claims priority to GB 0921486.7 filed 8 Dec. 2009, the entire contents of each of which are hereby incorporated by reference.

FIELD OF THE INVENTION

The present invention relates to an aerodynamic control surface assembly and a method of operating an aerodynamic control surface assembly.

BACKGROUND OF THE INVENTION

Spoilers are typically provided on the upper aerodynamic surface of an aircraft wing, between the main fixed wing box and the trailing edge flaps. The performance of the flaps can be improved by attaching them to the fixed wing box by drop hinge mechanisms. This allows the flaps to be deployed in both aft and downward directions and to be rotated downwardly (or "drooped"). When the flaps are deployed in this way, gaps are formed between the trailing edges of the spoilers and the leading edges of the flaps. Small air gaps in these regions improve lift when compared to conventional Fowler flaps. However, if these gaps are too large and the continuity of the upper aerodynamic surface is not maintained, then the performance of the flaps is reduced. To control the size of these gaps, the spoilers are rotated downwardly (or "drooped") when the flaps are deployed (e.g. during take-off).

In normal operation, for example when the aircraft moves from the take-off configuration to the cruise configuration, the drooped spoilers are retracted to clear the way for the flaps to be retracted to their stowed (or cruise) positions. However, in the case of failure of the spoiler actuator control system, the spoiler can be locked down in the maximum droop position, thus causing jamming between the leading edge of the flap and the trailing edge of the spoiler when the flap is retracted. If the flap cannot retract to its cruise position, the performance of the wing deteriorates significantly. Therefore, a method of freeing the spoiler from the actuator is needed to allow the flap to retract even when the actuator control system fails.

SUMMARY OF THE INVENTION

A first aspect of the invention provides an aerodynamic control surface assembly comprising: an aerodynamic control surface; an actuator for controlling deployment of the control surface; and a locking mechanism moveable from a locked to an unlocked position, wherein the actuator is operatively coupled to the control surface when the locking mechanism is set to the locked position and the control surface can move independently of the actuator when the locking mechanism is set to the unlocked position. Advantageously, the locking mechanism may be resettable.

Preferably, the locking mechanism comprises a plurality of parts, at least one of which is a moveable part. In order to unlock the locking mechanism, the moveable part can be moved relative to another one of the parts, preferably without causing the failure of any of the parts of the locking mechanism. For example, the locking mechanism may comprise a slidable bar which can be displaced to toggle the locking mechanism from the locked position to the unlocked position. In this case, the locking mechanism preferably further comprises an actuator bracket which is rotatably coupled to the actuator, wherein the bracket comprises a projection which is adapted to engage the slidable bar in order to set the locking mechanism to its locked position. In order to unlock the locking mechanism, the slidable bar is displaced relative to the projection in order to disengage the bar from the projection. By unlocking the locking mechanism without causing any of the locking mechanism parts to fail, the number of parts which must be replaced after the locking mechanism has been unlocked can be minimised.

Typically, the slidable bar extends from the locking mechanism to the trailing edge of the control surface. The locking mechanism is preferably biased towards the locked position. This may be done, for example but not exclusively, by incorporating a spring into the locking mechanism in order to prevent the locking mechanism from being unlocked unintentionally during flight.

A second aspect of the invention provides an aircraft wing comprising the aerodynamic control surface assembly of the first aspect of the invention, the aircraft wing further comprising a second aerodynamic control surface positioned aft of the first control surface. In one embodiment of the invention, the first aerodynamic surface is a spoiler and the second aerodynamic surface is a flap.

Preferably the locking mechanism can be moved to an unlocked position by movement of the second control surface relative thereto. Preferably the locking mechanism is directly engaged by the second control surface—i.e. not via the first control surface, although the locking mechanism may be carried in whole or in part by the first control surface. In other words the load necessary to unlock the locking mechanism is not passed through the first control surface, only through the locking mechanism.

The locking mechanism preferably comprises a plurality of parts, at least one of which is a moveable part. In order to unlock the locking mechanism, the moveable part is moved relative to another one of the parts by contact with the second control surface as it moves, preferably without causing the failure of any of the parts of the locking mechanism.

The movable part is arranged to as to be directly actuated by the second control surface. Advantageously, a direct load path from the second control surface to the locking mechanism is thereby established, reducing or negating any requirement for load to be passed through the first control surface into the locking mechanism. This is advantageous to avoid unnecessary loading on the first control surface, which is primarily designed to withstand aerodynamic rather than structural loads. Should the system be used, the risk of damage to the first control surface by contact with the second control surface is minimised.

For example, the locking mechanism may comprise a slidable bar which can be displaced to toggle the locking mechanism from the locked position to the unlocked position. Preferably, the slidable bar extends from the locking mechanism to the trailing edge of the first control surface, where it can be directly contacted by the second control surface should the first control surface not move.

A third aspect of the invention provides a method of operatively decoupling an aerodynamic control surface from an actuator for controlling deployment of the control surface, the actuator being operatively coupled to the control surface by a locking mechanism when set to a locked position, the locking mechanism being moveable from the locked position to an unlocked position, the method comprising: unlocking the locking mechanism so that the control surface can move independently of the actuator.

Preferably, a second control surface is positioned aft of the first control surface, and the method further comprises: using movement of the second control surface to unlock the locking mechanism. An advantage of the invention is that the first control surface can be moved independently of the actuator when the locking mechanism has been unlocked in order to prevent jamming between the first and second control surfaces in the event of a failure of the actuator and/or its control system.

In one embodiment of the third aspect of the invention, the method further comprises moving the first control surface independently of the actuator; and retracting the second control surface into the position vacated by the first control surface. This movement of the first control surface may be positively actuated, but more preferably the first control surface is moved by the air flow. Typically, the locking mechanism is unlocked in response to a failure of the actuator control system.

Preferably, the method of third aspect of the invention further comprises displacing a slidable bar which extends from the locking mechanism to a trailing edge of the first control surface to unlock the locking mechanism. The locking mechanism optionally comprises an actuator bracket which is rotatably coupled to the actuator, the bracket comprising a projection which is adapted to engage the slidable bar in order to set the locking mechanism to its locked position. In this case, the method typically comprises displacing the slidable bar to disengage the projection from the bar to unlock the locking mechanism.

In one embodiment of the third aspect of the invention, the aerodynamic control surface assembly is mounted to an aircraft wing, the first aerodynamic surface is a spoiler and the second aerodynamic surface is a flap.

BRIEF DESCRIPTION OF THE DRAWINGS

Embodiments of the invention will now be described with reference to the accompanying drawings, in which:

FIG. 3 is a front elevation of the spoiler of FIGS. 1-2;

FIG. 4 is a cross sectional view of the spoiler of FIGS. 1-3 across line A-A indicated in FIG. 3;

DETAILED DESCRIPTION OF EMBODIMENT(S)

Figure 1:
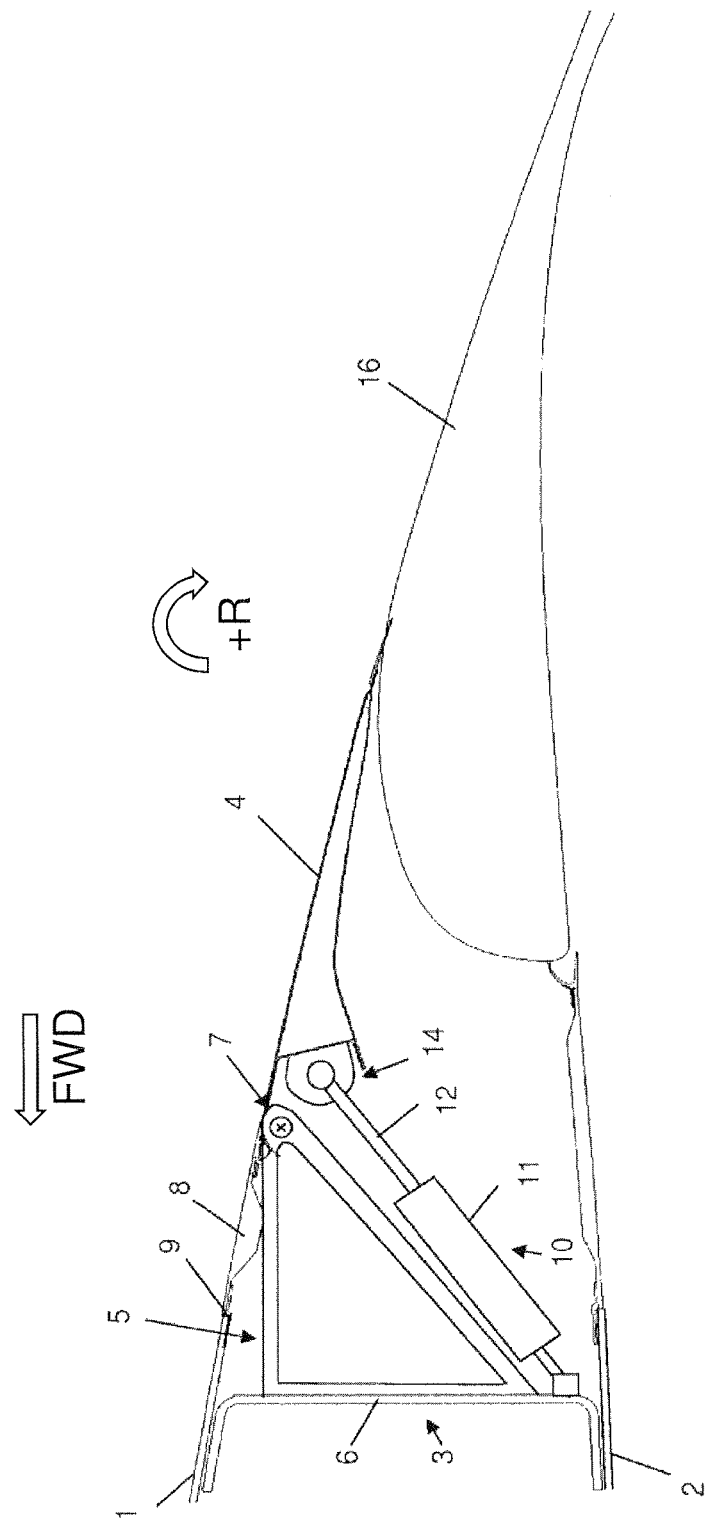
FIG. 1 is a schematic cross-sectional view through the trailing edge of an aircraft wing with a spoiler and a flap both shown in their cruise positions.

FIG. 1 shows a schematic chord-wise cross sectional view through the trailing edge of an aircraft wing. The aircraft wing comprises a fixed wing box comprising upper and lower covers 1, 2 which are bolted to, and extend between, a front spar (not shown) and a rear spar 3. A drooping spoiler 4 is pivotally attached to a pair of structural ribs 5 (one of which is shown in FIG. 1) which are bolted to the rear spar 3. A clevis fitting 7 is formed at the join between the upper and lower arms of each rib 5 for attaching the spoiler 4 to the fixed wing box. An upper panel 8 extends from the aft edge of the upper cover 1 and is attached thereto by a butt-strap 9. Deployment of the spoiler 4 is controlled by a hydraulic actuator 10 which is mounted to the rear spar 3 and comprises a cylinder 11 and a piston 12. The piston 12 is releasably coupled to the spoiler 4 by an actuator attachment bracket 14 (see below). A flap 16 is positioned directly aft of the spoiler 4 and is pivotally attached to the wing box by a drop-hinge mechanism (not shown).

Figure 2:
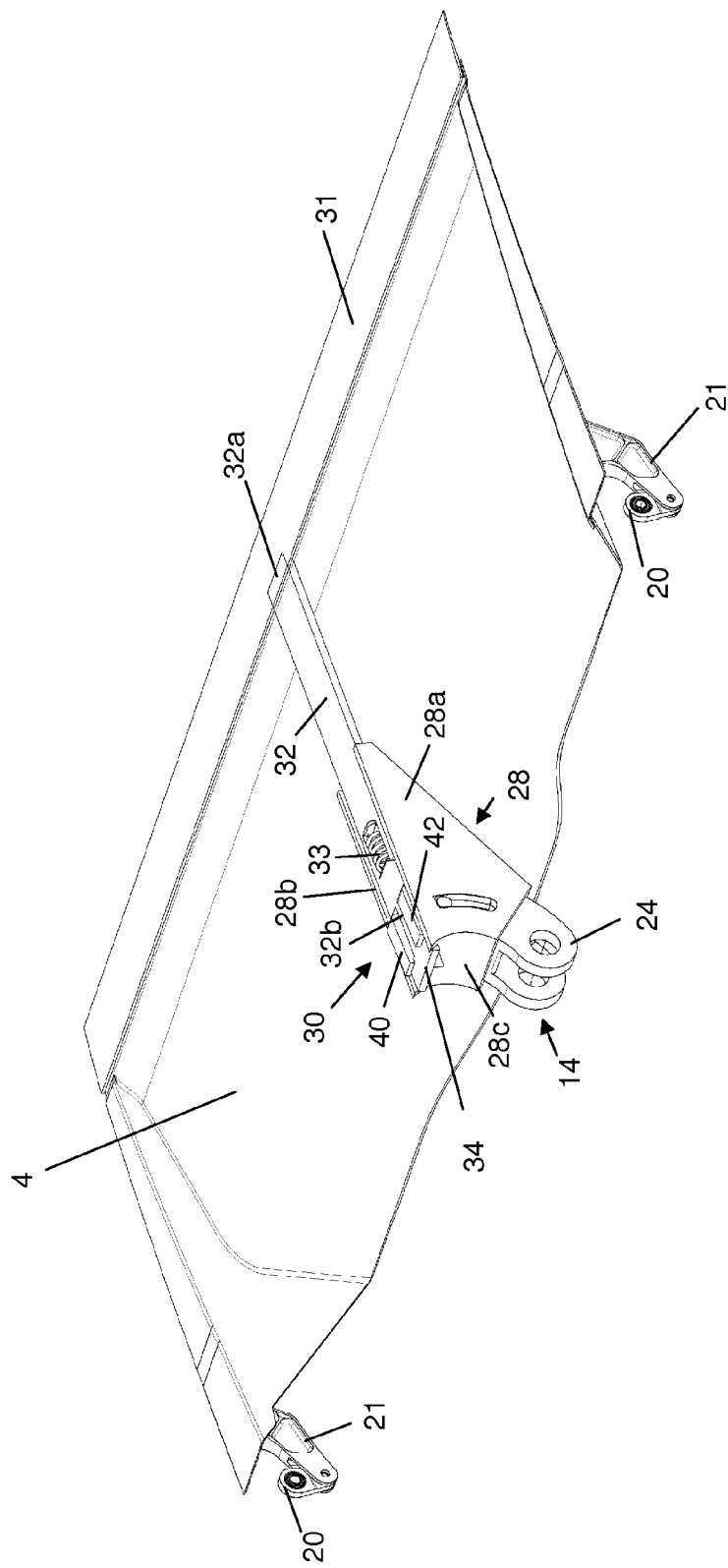
FIG. 2 is a perspective view of the spoiler of FIG. 1 with its top panel removed.

FIG. 2 is a perspective view of the spoiler 4 with its top panel removed. The spoiler 4 has a pair of lugs (omitted from FIG. 2 for clarity) which extend from its leading edge for pivotal attachment to the clevis fittings 7 of the structural ribs 5 (via a pivot pin). The spoiler 4 also has a pair of drop links 20 which extend from its leading edge and are attached to the underside thereof by a corresponding pair of brackets 21. Each of the drop links 20 is pivotably attached via a pivot pin to a common rib or end support (not shown) which forms part of the fixed wing box. This arrangement allows the spoiler 4 to conform to the shape of the wing during cruise.

As shown most clearly in FIGS. 2 and 3, the actuator attachment bracket 14 is attached to the underside of the spoiler 4, approximately in the centre of its span. As most clearly shown in FIGS. 2 and 4, the actuator attachment bracket 14 comprises an exposed clevis fitting 24 which extends from a curved arm 26. The arm 26 is contained within a correspondingly curved channel in a housing 28 positioned towards the leading edge of the spoiler 4. As well as having a curved inner channel, the housing 28 has a pair of side walls 28a, 28b, a front wall 28c which extends between the front edges of the side walls 28a, 28b and an inclined rear wall 28d which extends between the aft edges of the side walls 28a, 28b. An opening 28e is formed between the rear wall 28d and the front wall 28c, through which the clevis fitting 24 projects. The exposed clevis fitting 24 extends forward (in the direction of the arrow FWD in FIGS. 1, 5 and 7) of the leading edge of the spoiler 4 for the rotatable attachment of the spoiler leading edge to the distal end of the actuator piston 12 (see FIGS. 1, 5) via a pivot pin.

Still referring to FIG. 2, the actuator attachment bracket 14 is releasably coupled to the spoiler 4 by a resettable locking mechanism 30, which can be toggled between a locked position and an unlocked position (see below). Note that FIG. 2 shows the locking mechanism 30 in its locked position. A slidable bar 32, which is attached to the spoiler 4, extends from the locking mechanism 30 to the trailing edge of the spoiler 4. The bar 32 is slidable in a chord-wise direction. The side walls 28a and 28b of the housing 28 extend vertically upwards to cover the sides of the bar 32, forming a channel which guides the chord-wise movement of the bar 32. It is noted here that the bar 32 is biased in the aft direction by a spring 33, but this will be explained in more detail below. The trailing edge of the spoiler 4 comprises a sealing strip 31 which is made from, for example but not exclusively, carbon fibre reinforced plastic (CFRP) and is biased towards the flap 16 (not shown in FIG. 2). Most of the bar 32 is housed within the spoiler 4. However, the distal end 32a of the bar 32 is exposed beneath the sealing strip 31, while its proximal end is exposed beneath the spoiler leading edge.

The locking mechanism 30 works by the interaction between the slidable bar 32 and the actuator bracket 14. In particular, towards its proximal end, the bar 32 has a narrowed section 32b and a head 34. The narrowed section 32b, together with the side walls 28a and 28b of the housing 28, form a pair of slots 36, 38 (see FIG. 6b). A pair of projections 40, 42 extend from the upper surface of the curved arm 26 which are sized to fit through the slots 36, 38 (see FIG. 6a) respectively. As most clearly shown in FIG. 6a, the projections 40, 42 also have a pair of slots 44, 46 in their leading edges. When the locking mechanism is in its locked position (see FIG. 2), the aft edge of the head 34 is fitted into the slots 44, 46 in the projections 40, 42. As the bar 32 is housed within the spoiler 4 and the actuator 10 is attached to the actuator bracket 14, the interaction between the head 34 of the bar 32 and the slots 44, 46 operatively couples the spoiler 4 to the actuator 10. Therefore, in normal service, the locking mechanism 30 is set to its locked position.

Figure 5:
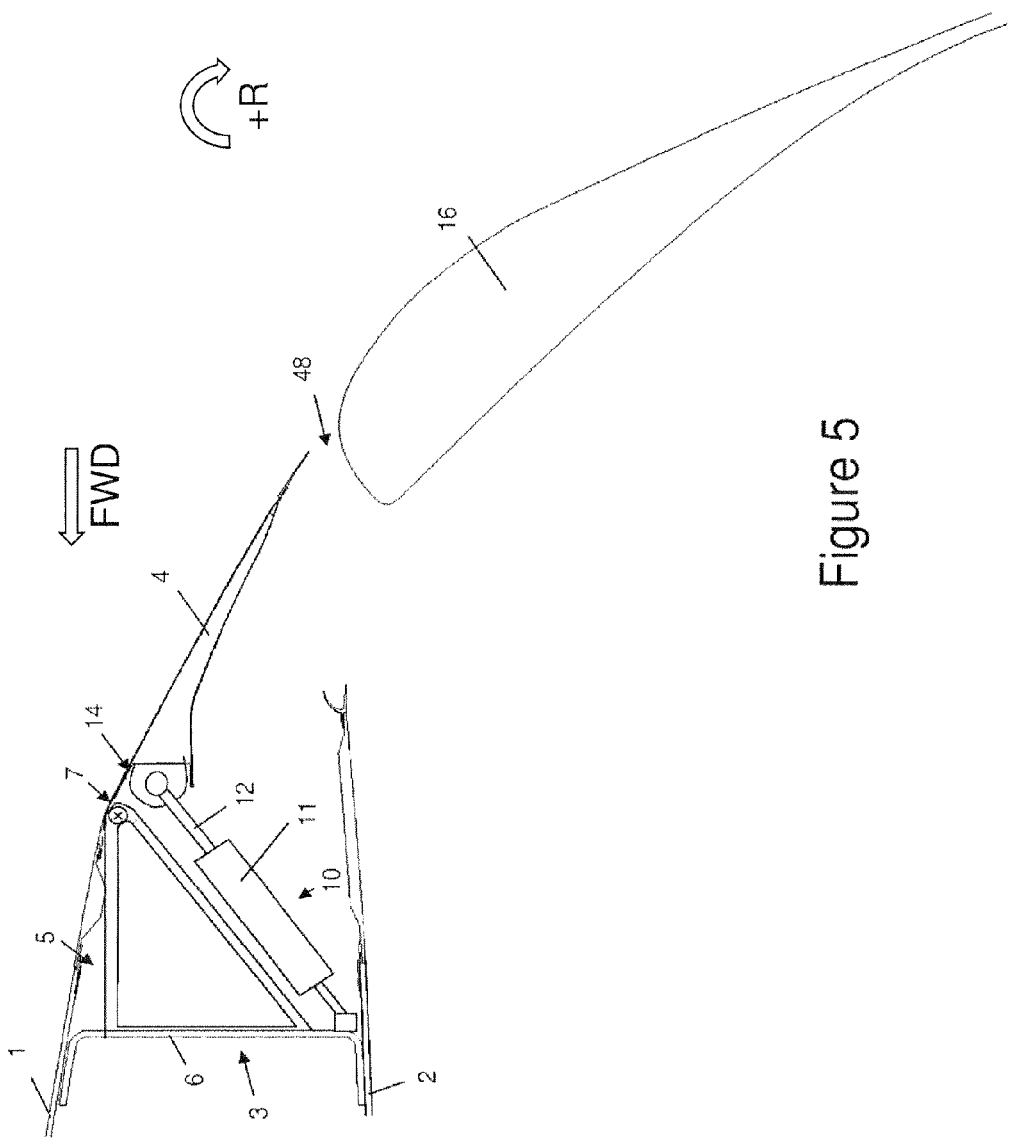
FIG. 5 is the view of FIG. 1 with the spoiler and the flap in their deployed positions.
Figure 7:
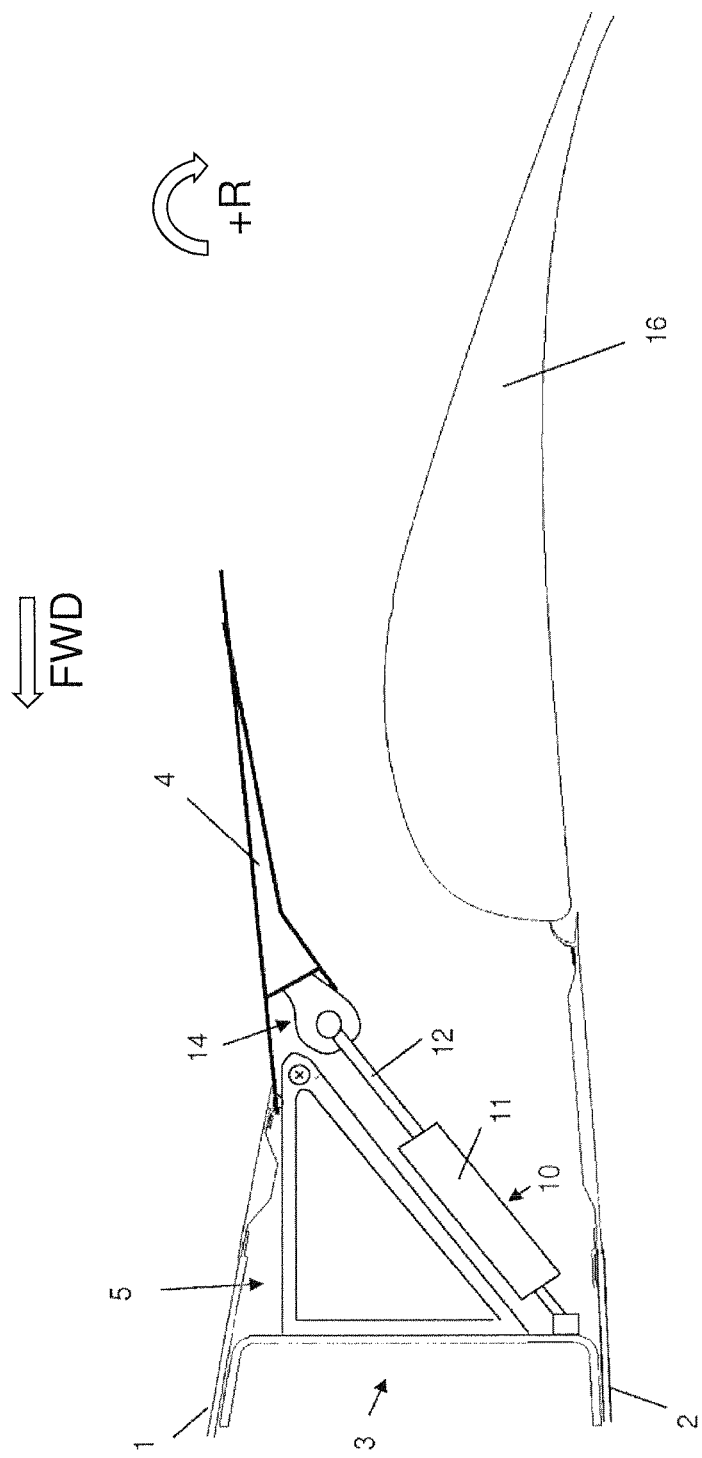
FIG. 7 is the view of FIGS. 1 and 5 with the spoiler floating in the air flow having been operatively decoupled from the actuator, and the flap retracted to its cruise position.

The piston 12 of the actuator may be extended out from, or retracted into, the cylinder 11 to pivot the spoiler 4 anticlockwise or clockwise (the clockwise direction being in the direction of the arrow +R in FIGS. 1, 5 and 7) respectively. For example but not exclusively, the spoiler 4 may be pivoted anticlockwise about an angle of up to +55° to a braking position. In this position, the spoiler significantly reduces lift and also increases drag. Additionally, again relative to the cruise position shown in FIG. 1, the spoiler may be pivoted clockwise about an angle of up to −15° to a drooped position. This is illustrated by FIG. 5, in which the flap is shown in its take-off configuration where it is deployed in both aft and downward directions and rotated downwardly (or "drooped"). In this configuration, as described above in the Background section, the spoiler is deployed to its drooped position in order to decrease the size of the air gap 48 between the trailing edge of the spoiler 4 and the leading edge of the flap 16, thus ensuring that high lift is achieved when the flap 16 is deployed.

In the case of a runaway failure of the spoiler actuator control system (which may be a global or a local failure), the spoiler 4 can be locked down in the maximum droop position. In this case, the piston 12 of the actuator 10 is fully retracted into the cylinder 11 and the interaction between the slots 44, 46 and the head 34 of the bar 32 locks the spoiler in position. As illustrated in FIG. 5, if this failure mode occurs when the flap 16 is deployed, the spoiler 4 will be locked in position immediately forward (in the direction of arrow FWD) of the flap 16, blocking its retraction path. Thus, when the flap 16 is retracted, its leading edge clashes with the trailing edge of the spoiler 4. When the flap 16 pushes against the spoiler trailing edge, the sealing strip 31 is compressed and the exposed distal end 32a of the slidable bar 32 is pushed by the leading edge of the flap 16. When the force exerted by the flap 16 on the bar 32 exceeds the biasing force provided by the spring 33 (see below), the bar 32 will be displaced in a forward direction. This in turn pushes the head 34 of the bar 32 out of the slots 44, 46, unlocking the locking mechanism 30. This removes the direct attachment between the actuator bracket 14 and the bar 32, releasing the housing 28, and more importantly the spoiler 4, to pivot independently of the actuator bracket 14 and the actuator 10. Thus, decoupling the actuator bracket 14 from the bar 32 operatively decouples the actuator 10 from the spoiler 4. Note that, as the sealing strip 31 is not typically substantially resilient, it typically becomes permanently deformed when compressed by the flap 16. In this case, the sealing strip 31 will need to be replaced.

The slidable bar 32 is biased in an aft direction (i.e. towards the locked position) in order to ensure that the locking mechanism is not unintentionally set to its unlocked position by, for example, the aerodynamic loads or by the flap 16 sliding against the underside of the bar 32 during normal service. As noted briefly above, the biasing force is provided by a spring 33 which is housed in a gap 61 in the bar 32, which is positioned at an intermediate position along its length, and a corresponding recess 62 in the housing 28 (see FIG. 4). As shown most clearly in FIG. 4, a stopper 63 extends upwardly from the forward edge of the recess 62 in the housing 28, while the bar 32 is provided with a raised lip 64 at the trailing edge of the gap 61. When the bar 32 is pushed in a forward direction by the flap 16, the raised lip 64 moves with the bar while the stopper 63 remains unmoved (as it is fixed to the housing 28). Under the forward force exerted on the bar 32 by the flap 16, the lip 64 compresses the spring against the stopper 63. The biasing force exerted by the spring 33 on the lip 64 in an aft direction thus inhibits movement of the bar 32 in a forward direction. Consequently, a significant force is required to displace the bar 32 in a forward direction. For example but not exclusively, the spring is designed to provide a biasing force of several tens of kiloNewtons. When the force on the bar 32 is removed, the spring expands again, pushing the lip 64 in an aft direction, forcing the bar 32 to slide back to its original position. The bar 32 is prevented from moving further aft of its original position by the interaction between the forward inner edge of the gap 61 and the stopper 63. It will be understood that the bar 32 may alternatively be biased by any other suitable method, such as for example but not exclusively, by a hydraulic piston/cylinder arrangement.

During service, when the locking mechanism is unlocked, the air flow is sufficient to pivot the spoiler 4 clear of the flap 16. This is illustrated schematically in FIG. 7 where the leading edge of the flap 16 has pressed against the trailing edge of the spoiler 4 as described above to release the locking mechanism, the air flow has caused the spoiler to pivot anticlockwise (i.e. opposite the direction of arrow +R) clear of the flap 16, and the flap 16 has been safely retracted through a position vacated by the spoiler 4 to its stowed (or cruise) configuration.

Figure 6:
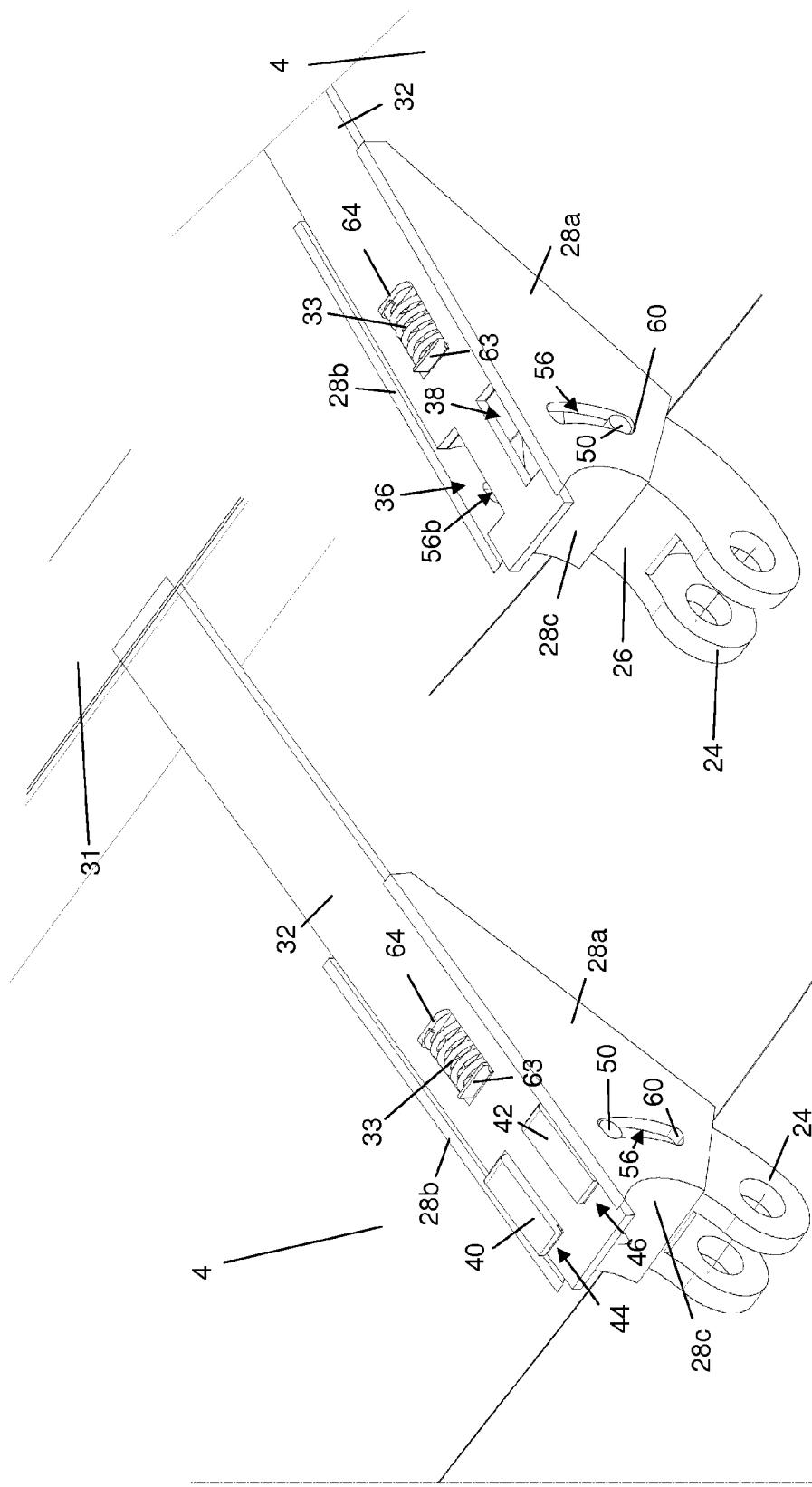
FIGS. 6a-b are close up perspective views of the locking mechanism which releasably couples the spoiler of FIGS. 1-4 to an actuator, with the locking mechanism in its unlocked position, before and after the spoiler has been pivoted clear of the flap respectively.

As shown most clearly in FIGS. 6a, 6b, an end-stop 50 is provided which constrains the upwards pivotal range of the spoiler 4 with respect to the actuator attachment bracket 14 as it pivots under the force of the air flow when the locking mechanism 30 is unlocked during flight. The end-stop 50 comprises a cylindrical projection which extends from a side wall of the actuator bracket 14 through a curved slot 56 in the side wall 28a of the housing 28. As described above, in the event of failure of the actuator control system, the locking mechanism is unlocked and the air flow causes the spoiler to pivot upwards, thus causing the housing 28 (and the curved slot 56) to pivot upwards with it. As the position of the actuator 10 is fixed in the event of an actuator control system failure, the position of the actuator bracket 14 (and thus the end-stop 50) also remains fixed. There is therefore a relative movement of the housing 28 with respect to the actuator bracket 14 and, consequently, relative movement of the slot 56 with respect to the end-stop 50. The spoiler 4 is free to pivot upwardly until a locking surface 60 at the inner lower edge of the curved slot 56 engages the end-stop 50 (see FIG. 6b) which restricts further pivotal motion of the spoiler 4 in that direction. An identical end-stop (not shown) projects from the opposite side wall (not shown) of the actuator bracket 14 through an identical curved slot 56b (see FIG. 6b) in the opposite outer face 28b of the housing 28.

As described above, when the locking mechanism 30 has been unlocked, the slidable bar 32 retracts to its original position under the biasing force of the spring 33. When this occurs, the slots 36, 38 are no longer aligned with the projections 40, 42 which extend from the upper surface of the actuator bracket 14. Therefore, to lock the locking mechanism 30 from its unlocked position (that is, to reset the locking mechanism 30), for example after the aircraft has landed, the slidable bar 32 is pushed in a forward direction to align the slots 36, 38 with the projections 40, 42. This may be done, for example but not exclusively, using a mechanical device. Meanwhile the actuator bracket 14 is pushed upwards such that projections 40, 42 pass through the slots 36, 38 respectively. The bar 32 is then allowed to move in an aft direction under the biasing force of the spring 33, causing the aft edge of the head 34 to fit into the slots 44, 46 in the projections 40, 42, thus resetting the locking mechanism 30. Alternatively, the front edges of the projections 40, 42 may comprise respective chamfered surfaces (not shown) just above the slots 44, 46. In this case, the locking mechanism may be reset simply by pivoting the spoiler clockwise (with respect to the view shown in FIG. 6*a*, *b*) relative to the curved arm 26. Again, for example but not exclusively, this could be done using a mechanical device. When the chamfered surfaces of the projections 40, 42 engage the head 34 of the slidable bar 32, part of the clockwise force on the spoiler is translated by the chamfered surfaces into a force which pushes the slidable bar 32 in a forward direction against the biasing force of the spring 33. This allows the projections 40, 42 to become aligned with, and be inserted through, the slots 36, 38. As the spoiler is rotated further clockwise, the head 34 of the slidable bar 32 falls below the chamfered surfaces. At this point, as the head 34 is no longer in contact with the chamfered surfaces, the forward force on the slidable bar is removed and the biasing force of the spring 33 pushes the slidable bar 32 back in the aft direction. The aft edge of the head 34 is then inserted into slots 44, 46, and the locking mechanism is thus reset to its locked position. Note that the chamfered surfaces may alternatively be located on the underside of the head 34, or indeed the chamfered surfaces could be applied to both the underside of the head 34 and the front edges of the projections 40, 42. By making the locking mechanism resettable, the amount of maintenance work required after failure of the actuator control system is significantly reduced.

Whilst the invention has been described above with respect to a spoiler, it is also applicable to other aerodynamic control surfaces, such as, for example but not exclusively, elevators, ailerons and rudders. In these cases, an alternative means would typically be required to unlock the locking mechanism.

Although the invention has been described above with reference to one or more preferred embodiments, it will be appreciated that various changes or modifications may be made without departing from the scope of the invention as defined in the appended claims.

The invention claimed is:

1. An aerodynamic control surface assembly comprising:
   a first aerodynamic control surface;
   a second aerodynamic control surface, said second control surface moveable at least between deployed and stowed positions;
   an actuator for controlling deployment of the first control surface; and
   a locking mechanism moveable from a locked to an unlocked position, wherein the actuator is operatively coupled to the first control surface when the locking mechanism is set to the locked position and the first control surface can move independently of the actuator when the locking mechanism is set to the unlocked position, wherein, said first control surface at least partially extends into the path of said second control surface when moving between said deployed and stowed positions, wherein, upon failure of the actuator to retract the first control surface during stowing of the second control surface, the locking mechanism, as a result of movement of said second control surface, unlocks said locking mechanism.

2. The control surface assembly of claim 1 wherein the locking mechanism is resettable.

3. The control surface assembly of claim 1 wherein the locking mechanism comprises a slidable bar which, when displaced releases the locking mechanism from the locked position to the unlocked position.

4. The control surface assembly of claim 3 wherein the locking mechanism further comprises an actuator bracket which is rotatably coupled to the actuator, the bracket comprising a projection engaging the slidable bar setting the locking mechanism to the locked position.

5. The control surface assembly of claim 3 wherein the slidable bar extends from the locking mechanism to a trailing edge of the first control surface.

6. The control surface assembly of claim 1 wherein the locking mechanism is biased towards the locked position.

7. An aircraft wing comprising the aerodynamic control surface assembly of claim 1, wherein said second aerodynamic control surface is positioned aft of the first control surface.

8. An aircraft wing according to claim 7 in which the locking mechanism is configured to be directly engaged by the second aerodynamic control surface to move from the locked position to the unlocked position.

9. The aircraft wing of claim 7 wherein the first aerodynamic control surface is a spoiler and the second aerodynamic control surface is a flap.

10. A method of operatively decoupling a first aerodynamic control surface from an actuator for controlling deployment of the first control surface, a second aerodynamic control surface moveable between deployed and stowed positions, the actuator is operatively coupled to the first control surface by a locking mechanism when set to a locked position and the locking mechanism is moveable from the locked position to an unlocked position, the method comprising the steps of:
    moving the second control surface to a deployed position;
    moving, by actuation of said actuator, said first control surface at least partially extending into the path of said second control surface when moving between said deployed and stowed positions;
    whereupon failure of said actuator with said first control surface at least partially extending into said path, moving said second control surface toward a stowed position causes
    unlocking of the locking mechanism permitting the first control surface to move independently of the actuator.

11. A method of operatively decoupling a first aerodynamic control surface from an actuator for controlling deployment of the first control surface, a second aerodynamic control surface moveable along a path between deployed and stowed positions, the actuator is coupled to the first control surface by a locking mechanism when set to a locked position, and the locking mechanism is moveable from the locked position to an unlocked position, wherein the second aerodynamic control surface is positioned aft of the first control surface, the method comprising the steps of:
    moving the second surface to the deployed position;
    moving, by actuation of said actuator, said first control surface to at least partially extend into said path; and
    upon failure of said actuator with said first control surface at least partially extending into said path, moving said second control surface toward the stowed position and thereby unlocking the locking mechanism allowing the first control surface to move independently of the actuator.

12. The method of claim 10 wherein the locking mechanism is unlocked in response to a failure of an actuator control system.

13. The method of claim 11 wherein the first control surface is moveable independently of the actuator to prevent jamming between the first and second control surfaces.

14. The method of claim 10 further comprising:
moving the first control surface independently of the actuator; and
retracting the second control surface into a position vacated by the first control surface.

15. The method of claim 10 further comprising displacing a slidable bar which extends from the locking mechanism to a trailing edge of the first control surface to unlock the locking mechanism.

16. The method of claim 15 wherein the locking mechanism comprises an actuator bracket which is rotatably coupled to the actuator, the bracket comprising a projection adapted to engage the slidable bar to set the locking mechanism to said locked position, the method comprising the step of displacing the slidable bar to disengage the projection from the bar to unlock the locking mechanism.

17. The method of claim 11 wherein the first control surface is moved independently of the actuator by air flow.

18. The method of claim 11 wherein the first and second aerodynamic control surfaces are mounted to an aircraft wing, the first aerodynamic control surface is a spoiler and the second aerodynamic control surface is a flap.

* * * * *